3,066,915
POST PULLER DEVICE
Linferd Linabery, Sr., Gladwin, Mich.
Filed Nov. 18, 1957, Ser. No. 697,050
2 Claims. (Cl. 254—132)

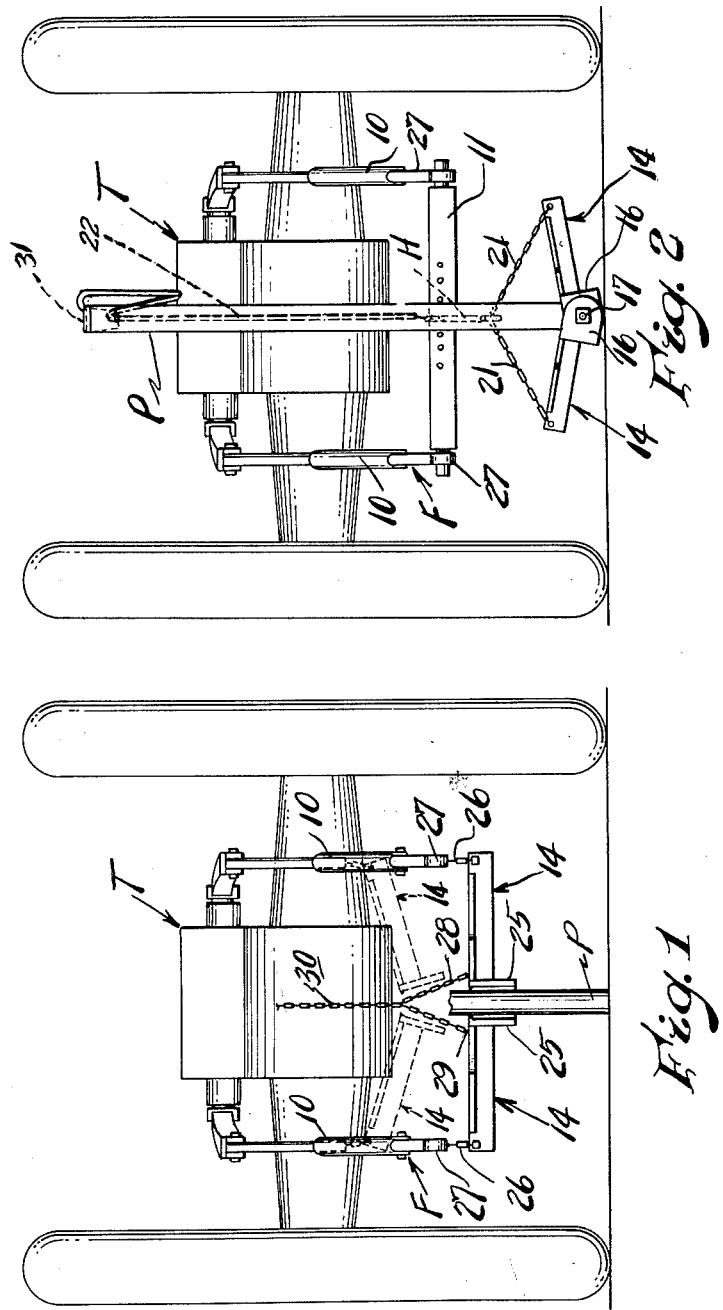

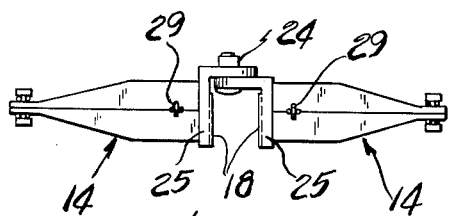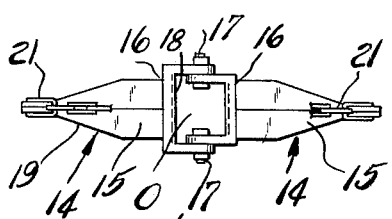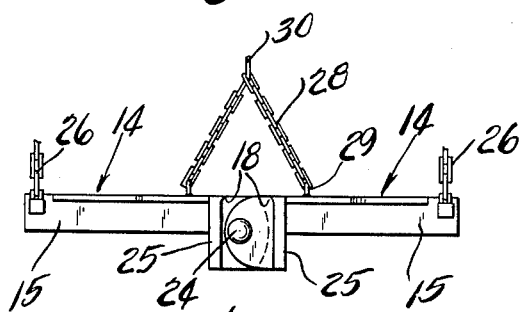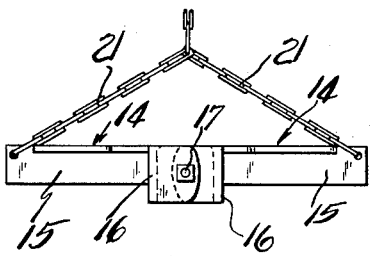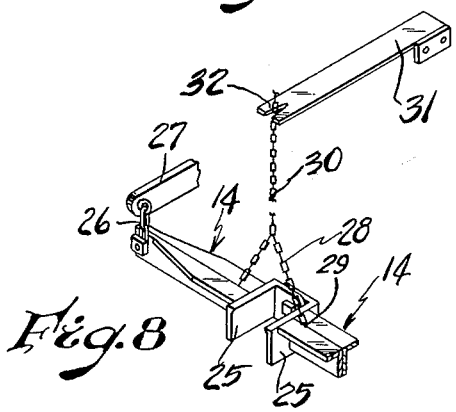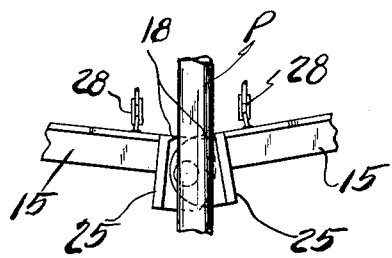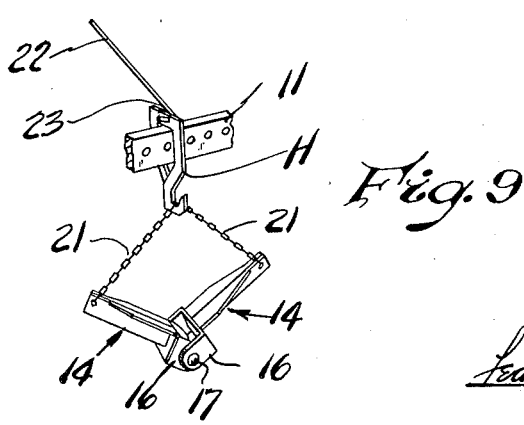

This invention relates generally to post and stake pulling devices, and more particularly to a post puller adapted for attachment to and actuation by a tractor.

One of the prime objects of the invention is to design a post puller device adapted for or attached to a tractor equipped with lifting means for easy positioning or spotting with relation to the post or stake to be pulled, so that the entire spotting and pulling operation can be handled by the operator while seated on the tractor seat.

Another object of the invention is to design a post pulling device of simple, practical and economical design, which can be easily and quickly assembled on or removed from the tractor lifting frame by one man, and which can be utilized to pull posts of varying length and diameter without requiring any special adjustments or changes in the device.

A further object is to provide a post puller which firmly grips the posts as the tractor lifting frame is actuated; which automatically swings to open position by gravity when the power is cut off and the frame lowered, and which is provided with hardened toothed beads or work engaging sections to minimize wear and avoid breakage of the jaws.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

FIG. 1 is a fragmentary, rear elevational view of a tractor showing the power actuated lifting frame, with the lifting device clamped in position on a fence post, the broken lines showing the jaws swung to gripping relation.

FIG. 2 is a view similar to FIG. 1 showing a slightly modified construction.

FIG. 3 is an enlarged, rear elevational view of the device shown in FIG. 1.

FIG. 4 is a top plan view thereof.

FIG. 5 is an enlarged, rear elevational view of the construction shown in FIG. 2.

FIG. 6 is a top plan view thereof.

FIG. 7 is an enlarged, fragmentary, rear elevational view of the construction shown in FIGS. 3 and 4, showing the jaws clamped in position on a post.

FIG. 8 is a detail showing the connection of the chain stop to a tractor bracket or support.

FIG. 9 is a fragmentary, side elevational view of the hook, etc.

Referring now to the drawings in which I have shown the preferred embodiment of my invention. The post puller attachment is herein shown in assembly in FIG. 2 of the drawings, is connected to the lifting frame F of a conventional tractor indicated by the letter T, said lift frame including a pair of spaced apart lift arms 10—10, with a draw bar 11 spanning the free ends of the arms.

The specific puller mechanism comprises a pair of opposed, horizontally disposed members 14—14, each member including an elongated arm 15, preferably angular in cross section, with the inner ends terminating in U-shaped jaw sections 16—16, pivotally connected together by means of bolts 17. A strip of hard metal 18 is provided on and extends across the upper inner edge of each jaw, said strip firmly gripping the fence post P to minimize wear and breakage.

The passage O formed by the connected jaws 16—16, must be of sufficient area to accommodate the post therein, and the jaws 16 must be of a size to readily grip posts of different sizes so that when the lift frame is actuated to swing the free ends of the arms upwardly, the jaws firmly grip the work. The outer free ends of the arms 15 are preferably tapered as at 19 and these can be formed by welding the pairs of angles 15—15 in back to back relation, and a chain 21 is connected to the end of each arm as shown.

A hook member H is mounted on the drawbar 11 and a flexible cord 22 is attached to an opening 23 provided in the shank of the hook, this cord leading to the driver's seat, so that the driver can swing the hook to facilitate engagement with the chain 21.

It is not necessary for the tractor operator to leave his seat to place the attachment on a post. He first actuates the lift frame F to raise the members 14—14 above the post with the passage O in vertical alignment with said post, the frame is then lowered to locate the jaws 16—16 close to the ground, after which the frame is again raised, the free ends of the arms 14—14 swinging upwardly so that the hardened edge 18 bites into the post, and continued upward travel of the frame readily pulls the post free, or with a deeply embedded long post, a series of pulls may be necessary before the post is finally removed from the ground, after which the tractor is again operated to bring it into position for the next post to be pulled.

In FIGS. 3 and 4 of the drawing I have shown a slightly modified construction, in which an open-jaw arrangement is provided, with a bolt 24 connecting the jaws 25. With this design it is not necessary to raise the arms and slide them over the top of the post, because the jaws are angular in shape, the one end being open so that the tractor may be reversed to bring the jaws 25—25 into engagement with the post. In this modification, the drawbar is removed and short lengths of chain 26 are anchored to the arms and to the lift levers 27 of the lift frame.

A chain yoke 28 is secured to bolts 29, provided on the arms 14 directly adjacent to the jaw members 25, and a length of chain 30 is connected to the yoke 28 and leads to a support 31 mounted on the tractor directly adjacent the operator's seat, the free end of the support being slitted as shown at 32 in FIG. 8 of the drawing to accommodate one of the chain links. This chain 30 serves as a stop to permit the arms 14 to swing to a horizontal position when the lift levers 27 are in a certain predetermined position, and this can of course, be varied by adjusting the chain in the slit.

The lift frame is actuated from the power plant of the tractor, and it is not deemed necessary to show or describe this in detail, as it is of conventional design presently in use on tractors in general.

The device is very simple, practical, and economical to operate, it can be readily attached to a tractor, and the post or stake pulling requires only the tractor driver, no further help is necessary. There is no digging, hand pulling, or other labor required, and a large number of posts can be pulled in a minimum length of time and at very little expense.

From the foregoing description, it will be obvious that I have perfected a very simple, practical, and inexpensive post pulling attachment which can be readily manufactured and assembled, and which is very easy to attach or remove.

When the device of either embodiment is conditioned to pull a post, the outer free ends of the arms 14 are at a level above the level at which the hardened edges 18 engage the post, as is best shown in FIGURES 2, 7, and 9. As a result, the lifting force exerted on the pulling device can be inclined somewhat to the vertical without tending to cause the device to tip.

What I claim is:

1. A combination with a power actuated tractor lift frame and drawbar, of a post pulling apparatus comprising, a pair of opposed, horizontally-aligned, gripping members arranged in end to end relation, each gripping member terminating in a U-shaped jaw provided on the inner end thereof, with the open ends of the jaws pivotally secured together about a common center to accommodate fence posts of varying diameters therebetween, flexible means connecting the outer free ends of the gripping members and forming a loop, a hook member adjustable on the tractor lift drawbar, said looped flexible means being engageable with the hook member for pulling the post as the lift frame is actuated.

2. The combination defined in claim 1 in which a flexible cord is connected to said hook and extends above said drawbar for positioning said hook.

References Cited in the file of this patent

UNITED STATES PATENTS

| | | |
|---|---|---|
| 148,148 | Smith | Mar. 3, 1874 |
| 984,764 | Johnson | Feb. 21, 1911 |
| 1,249,947 | Gilbert | Dec. 11, 1917 |
| 2,218,845 | Kiggins | Oct. 22, 1940 |
| 2,374,406 | Bezzirides | Apr. 25, 1945 |
| 2,553,077 | Braun | May 15, 1951 |